(No Model.)
J. R. MOORE.
BABY CARRIAGE.
No. 334,030. Patented Jan. 12, 1886.
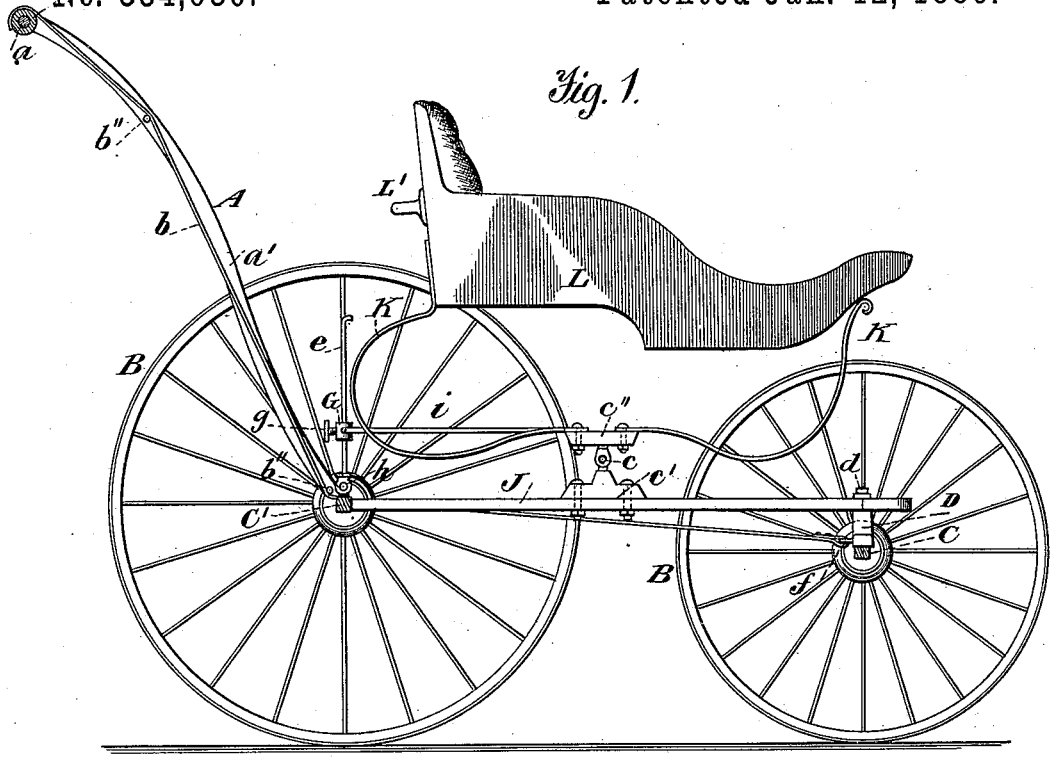
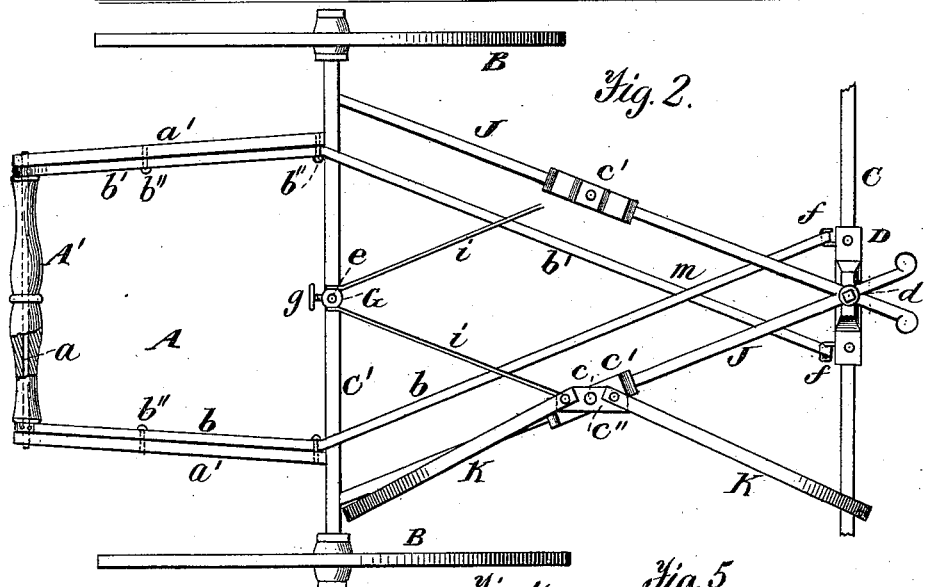
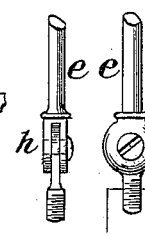
Witnesses.
A. Ruppert.
G. E. Tucker.
Inventor.
John R. Moore,
Per
Thomas P. Simpson,
Attorney.

United States Patent Office.

JOHN R. MOORE, OF NEWTON, MASSACHUSETTS.

BABY-CARRIAGE.

SPECIFICATION forming part of Letters Patent No. 334,030, dated January 12, 1886.

Application filed August 17, 1885. Serial No. 174,614. (No model.)

*To all whom it may concern:*

Be it known that I, JOHN R. MOORE, of Newton, in the county of Middlesex and State of Massachusetts, have invented an Improved Baby-Carriage, of which the following is a specification.

The special objects of the invention are, first, to make a baby-carriage so that it may be easily turned in any direction without lifting any part of the carriage; secondly, so that it may be inclined to the front or rear while resting entirely upon its springs.

Figure 1 of the drawings is a longitudinal vertical section of a baby-carriage. Fig. 2 is a plan view of the supporting-frame. Figs. 3, 4, 5 are detail views, enlarged to more clearly show the construction.

In the drawings, A represents the push-frame, which carries the hollow handle A', arranged to turn about the tie-rod $a$; B, the wheels, and C C' the axles. The latter are connected by the rods J J, which cross on the front axle, C, and are there secured by a pivot-bolt, $d$, that also secures the head-piece D.

$b\ b'$ are straps, whose ends are fastened to the roller-handle A', one passing over and the other under it, so as to wind in opposite directions. They are carried along the bars $a'$, over the pins $b''$, crossed at $m$, and secured at the ends to hooks $f\ f$ upon the front axle, C. By turning the roller-handle A in either direction, the front axle is caused to turn upon its pivot, and the carriage is easily guided in any direction.

L represents the body of carriage, which is supported upon the running-gear as follows:

For this purpose I employ an elbow-joint, $c$, screwed at the bottom into a block, $c'$, bolted to the rod J, and at the top into a block, $c''$, whose edge is parallel to the side of carriage-body L. To this block $c''$ are bolted the springs K K', which turn outwardly to the side of body, and the brace-rods $i$, the same bolts being made to secure both. I connect the brace-rods $i\ i$ at their ends to a sleeve, G, which slides and is adjustably clamped upon a vertical rod, $e$, by the thumb-screw $g$. This rod $e$ is hinged or pivoted at $h$ to the upper side of the rear axle, C', and bent at the upper end to form a stop to prevent the escape of the sleeve G. On the back of the body I place a handle, L', by which to hold up the body while slide G is being adjusted into the desired position. By this construction it will be seen that the body and springs are always and necessarily adjusted at the same time and to the same extent, while their local relation is never changed.

I am aware that it is not broadly new to connect the spool on cross-bar of handle with each side of the front axle by straps; but

What I claim is—

The combination, with a baby-carriage running-gear, of a body and springs therewith connected by a pivot-joint, $c$, the rods $i\ i$, the sliding sleeve G, and the vertical rod $e$, hinged to rear axle, substantially as and for the purpose specified.

JOHN R. MOORE.

Witnesses:
  JAMES DENNIS,
  JOHN J. DUNN.